P. DURING.
FRUIT JUICE EXTRACTOR.
APPLICATION FILED JULY 25, 1921.

1,432,166. Patented Oct. 17, 1922.

INVENTOR.
Paul During
BY
Stuart C Barnes
ATTORNEY.

Patented Oct. 17, 1922.

1,432,166

UNITED STATES PATENT OFFICE.

PAUL DURING, OF DETROIT, MICHIGAN.

FRUIT-JUICE EXTRACTOR.

Application filed July 25, 1921. Serial No. 487,444.

*To all whom it may concern:*

Be it known that I, PAUL DURING, a citizen of Germany, residing at Detroit, in the county of Wayne and State of Michigan, have invented certain new and useful Improvements in Fruit-Juice Extractors, of which the following is a specification.

This invention relates to fruit juice extractors. It has for its object a single domestic appliance that can be impaled in the fruit and by pressing on the fruit the juice may be extracted through suitable passage-ways and the delivery tube. The appliance is especially useful as it may be very conveniently and altogether properly used at the breakfast or dining table by one who desires to avail himself of the juices of the orange, lemon or similar fruits.

The appliance is so designed that the parts may be relatively cheaply manufactured by an automatic screw machine, a stamping press, and on tubing machines, as will be more fully described.

In the drawings,—

Figure 2:
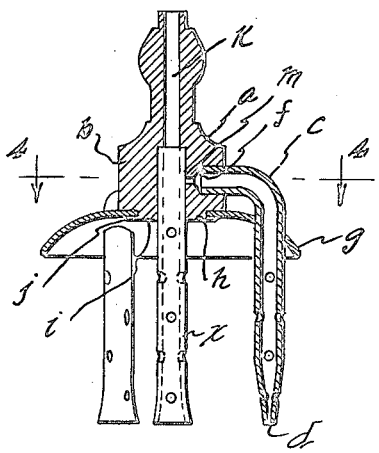
Fig. 2 is a vertical cross section.
Figure 1:
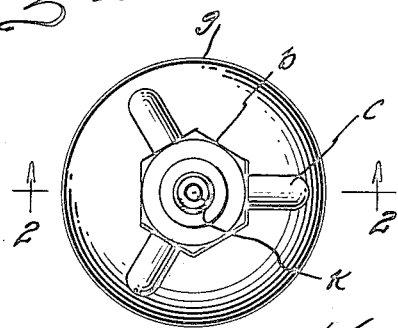
Fig. 1 is a plan view of the appliance.
Figure 3:
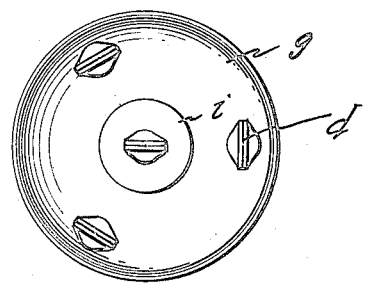
Fig. 3 is an inverted plan view.
Figure 4:
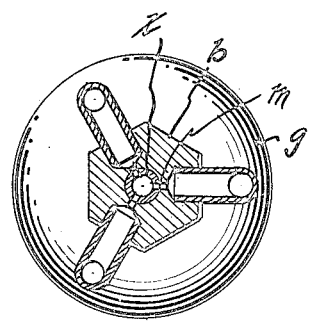
Fig. 4 is a section on the line 4—4 of Fig. 2.

$a$ designates the body of the appliance, which is an automatic screw machine product having a "hex" base portion $b$ providing faces to receive the elbow-like tubes $c$. These tubes are perforated and are formed with tapered ends, which are soldered together at $d$. This forms a relatively sharp end which permits the tube to be driven into almost any kind of fruit. By soldering up the ends none of the fruit fiber will be driven up into the tube to stop it. These elbows fit tightly in the drilled openings $f$ in three of the faces of the "hex" base. They may be soldered and sweated into place so that they will not come out.

These elbow-like tubes pass through a sheet metal cup $g$ which fits onto the boss $i$ in the bottom of the "hex" base. This boss is provided with a raised ring when the body is formed on the screw machine. This ring is then peened over to form a retaining shoulder $j$ that holds the cup $g$ tightly to the body. The cup is formed to fit over the average orange or lemon, but obviously can accommodate itself to fruit of varying diameter.

The body is drilled coaxially to form a delivery passage-way $k$ and is also drilled with the small cross passage-ways $m$ which connect the sockets $f$ with the coaxial delivery passage-way $k$.

The use of the appliance is very simple. One simply drives it into the orange, lemon or other fruit until the cup $g$ rests about the skin of the fruit. One then continues to press on the fruit with his hand, forcing it against the cup $g$. This obviously applies pressure to the contents of the skin and the fluid portion of the contents will be expelled into the elbow-like tubes $c$ and the straight central tube $x$ and from there find their way into the delivery passage-way $k$. The appliance may be applied directly to the mouth so that the fruit juice is delivered into the mouth or the delivery tube portion of the body can be used in connection with a glass or other vessel to catch the juice.

What I claim is:

1. A fruit juice extractor, comprising a member adapted to rest against the outside of fruit, and one or more impaling tubes carried by said member which can be forced into the fruit and which are provided with perforations to enable the juices to find their way into the tube or tubes when pressure is applied to the fruit.

2. A fruit juice extractor, having in combination, a body provided with a passage-way, a member secured to the body which may rest against the outside of fruit, and an impaling tube arranged to be impaled in the fruit and to extract the juices therefrom when pressure is applied to the fruit against the said member and arranged to deliver the juices into the body to which it is attached.

3. A fruit juice extractor, comprising a body provided with a passage-way, a cup secured to the body and arranged to rest against the outside of the fruit, and one or more impaling tubes connected to the body and arranged to collect the juices in the fruit when the tubes are impaled in the fruit and pressure is brought against the fruit as it rests against the cup, the said impaling tube or tubes connecting with the passage-way in the body.

4. A fruit juice extractor, having in combination, a body provided with a delivery passage-way therethrough, a cup secured to to the body, and one or more impaling tubes having tapered or sharp ends and perforated to receive the juices of the fruit, said tube or tubes supported by the body and having connection with the passage-way through the body.

5. A fruit juice extractor, having in combination, a body provided with a central delivery passage-way, a plurality of elbow-like tubes engaging in the sides of the body and connecting with the delivery passage-way of the body, and a member supported by the body which may rest against the outside of the fruit, the said tube serving to collect the juices of the fruit when pressure is applied to the fruit against the said last mentioned member.

6. A fruit juice extractor, comprising a body having sockets in the sides and having a coaxial delivery passage-way provided with connecting cross passage-ways connecting with the sockets, a plurality of elbow-like tubes supported in said sockets and having their ends closed and tapered, the said tubes being perforated, and a cup supported by the body.

7. A fruit juice extractor, comprising a body in the form of a screw machine product having a central delivery passage-way and sockets in the sides, a plurality of elbow-like tubes engaging in said sockets and connecting with the central passage-way of the body, the said elbow tubes having their ends closed and tapered and provided with perforations, and a cup-like member carried on the lower end of the body and through which the said elbow-like tubes pass.

8. A fruit juice extractor, having in combination, a body having a coaxial passage-way, an impaling tube located at the end of said coaxial passage-way and perforated and having its end closed and tapered, a body provided with sockets in its side, a plurality of elbow-like tubes having their ends closed and tapered, said tubes being perforated, and a cup-like member carried on the end of the body and through which the elbow-like tubes engage.

9. A fruit juice extractor, comprising a body having a delivery passage therethrough, and a coaxial socket connecting with the delivery tube, a central impaling tube provided with perforations and closed and tapered at its end fitted into the coaxial socket, said body being provided with a plurality of sockets in its side and provided with a boss at its lower end, a cup fitted over said boss and secured in place by peening an extension of the boss over the cup, and a plurality of elbow-like tubes engaging through the cup and fitted into the sockets in the sides of the body and communicating with the central passage-way, said tubes being perforated and having their lower ends closed and tapered.

In testimony whereof I affix my signature.

PAUL DURING.